United States Patent [19]

Walker et al.

[11] Patent Number: 4,489,221
[45] Date of Patent: Dec. 18, 1984

[54] TELEPHONE LINE/SUBSCRIBER EQUIPMENT DISCONNECT APPARATUS

[75] Inventors: Herbert B. Walker; Richard S. Hoppough, both of Greensboro, N.C.

[73] Assignee: Micro Computer Systems, Inc., Greensboro, N.C.

[21] Appl. No.: 410,290

[22] Filed: Aug. 23, 1982

[51] Int. Cl.³ .......................... H04M 3/12; H04Q 1/20
[52] U.S. Cl. ................................... 179/19; 179/81 R; 179/175.3 F
[58] Field of Search ..................... 179/19, 27 G, 81 R, 179/175.3 R, 175.3 F

[56] References Cited

U.S. PATENT DOCUMENTS

| | | | |
|---|---|---|---|
| 4,041,255 | 8/1977 | Cambridge et al. | 179/175.3 R |
| 4,054,759 | 10/1977 | McGrath et al. | 179/175.3 R |
| 4,109,112 | 8/1978 | Denman et al. | 179/81 R |

Primary Examiner—Thomas W. Brown
Attorney, Agent, or Firm—Charles R. Rhodes; Judith E. Garmon

[57] ABSTRACT

A disconnect signal (e.g. 130 volts D.C.) is applied at the telephone central office to the tip and/or ring lines. A latching relay adjacent to the subscriber equipment operates directly responsive to the disconnect signal, i.e. without delay normally caused by capacitive or voltage buildup, to disconnect the line between the tip and/or ring lines to which the signal has been applied and the subscriber equipment. The relay simultaneously connects the signal to ground through a relatively large resistance to identify or confirm to the central office that the switching action has occurred, which in turn is indicative of line continuity. The relay also operates in a similar manner responsive to a reverse polarity signal (e.g. the re-establishment of the normal line voltage of −48 volts D.C.) to re-establish a normal operative condition.

6 Claims, 1 Drawing Figure

TELEPHONE LINE/SUBSCRIBER EQUIPMENT DISCONNECT APPARATUS

BACKGROUND AND SUMMARY OF THE INVENTION

In the telephone industry in recent years, it has become highly desirable to be able to quickly and easily, from the central office, disconnect a selected subscriber's equipment to determine whether or not a reported fault may be in the line between the office and the subscriber's station, or whether the fault may lie in subscriber's equipment. The reason for this is that when a fault is reported, generally by a subscriber, it may lie anywhere between the central office up to and including the subscriber's equipment. Before sending a repairman to a subscriber's location, a quick check could eliminate costly service calls if the fault is in the lines.

This problem is complicated with the recent increase in situations where the subscriber equipment is not owned by the telephone company, and the telephone company will not be recompensed if the fault lies in the subscriber's equipment itself.

Previous attempts to provide apparatus for quickly and easily disconnecting subscriber equipment from the telephone lines have generally all adopted an approach whereby the switching network is operated or activated responsive to a capacitive or voltage buildup. To effect the disconnect in such approaches, the telephone company applies a relatively large voltage to charge a capacitor or battery. When the charge rises to a prescribed level, a trigger or switch begins the discharge of the capacitor or battery through a relay. Operation of the relay to a second stage causes the customer's equipment to be disconnected. The normal condition is restored by applying a voltage of opposite polarity to reverse the status of the relay. Such an approach has several disadvantages. First, capacitors of the size contemplated are not reliable in that they tend to fail or have a short life. Secondly, such networks generally draw a small amount of current continuously, even when not in a test stage. Thirdly, such an approach is relatively slow-acting in that it requires approximately two seconds charge time and seventeen seconds discharge time. As a result the customer's phone is out of service for times up to approximately thirty seconds.

In the instant approach, the solution to the problem set forth above is approached by applying a line potential directly to a switching network to initiate the switching action. No capacitive or voltage buildup is necessary, and the network operates in a very short time span (on the order of milliseconds).

In general, the approach of the present invention is to apply a disconnect signal on at least one of the tip and ring lines (preferably both) which directly operates a first switching means to substantially immediately disconnect the selected one or both of the tip and ring lines from the subscriber equipment and to simultaneously connect the selected tip and/or ring line to ground through a prescribed resistance selected to be indicative of a line continuity. A second switching means operates directly responsive to the re-establishment of the normal voltage on the lines for immediately restoring the normal condition. The switching means contemplated in the present invention is a latching relay which is operated by a transistor, which in turn is activated by the receipt of the signal voltage. The relay contacts serve to disconnect the normal line condition and connect the signal voltage to ground through a relatively large resistance. When the central office sees in its equipment that its signal is connected to ground, it is then known that the lines are operative as intended, and the proper service personnel can be dispatched to correct the fault.

It is therefore an object of the present invention to provide an improved telephone line/subscriber equipment disconnect apparatus.

It is another object of the present invention to provide a disconnect apparatus of the type described which utilizes no capacitive or voltage charge/discharge to effect the switching action.

It is another object of the present invention to provide a disconnect apparatus of the type described which is electrically disconnected from the telephone lines during normal operations, so that no current is drained therefrom unless and until the switching action is instituted.

Other objects and a fuller understanding of the invention will become apparent upon reading the following detailed description of a preferred embodiment along with the accompanying drawing.

The sole FIGURE of the drawing (FIG. 1) is a schematic diagram of the disconnect apparatus according to a preferred embodiment of the present invention.

DETAILED DESCRIPTION OF A PREFERRED EMBODIMENT

Figure 1:
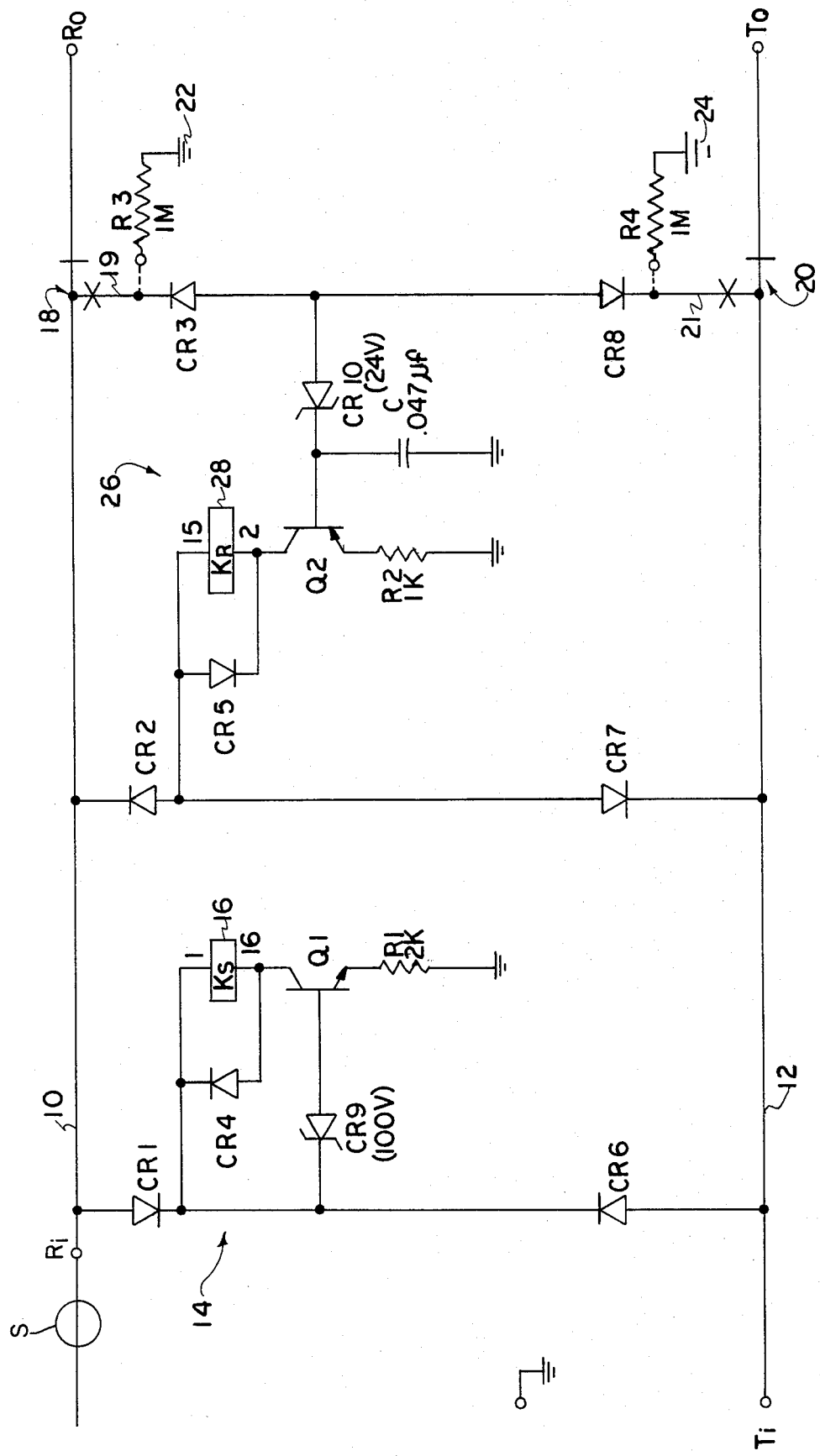

Turning now to the drawing, there is illustrated ring and tip lines 10 and 12 respectively, which are of course connected in a conventional manner between the telephone central office on the left and a customer's equipment on the right. In the normal condition, there is provided an essentially zero impedance path between the central office and the subscriber equipment through the telephone lines 10,12 and the closed relay contacts 18,20. This is known as the "thru" state. In this state the impedance between the tip and ring lines is essentially infinite for any voltage level. Voltage levels below the CR9 breakdown (100 volts) also appear as an essentially infinite impedance to ground.

The apparatus according to the present invention comprises a first switching means or network 14 connected between lines 10,12, in which a threshold diode CR9 (preferably a zener diode) acts as a recognition means of the disconnect signal from generating means S. The network then normally blocks all voltages into a transistor Q1 which may occur during normal operation of the telephone lines, even when a ringing signal is received. It should be noted that in a conventional telephone system, the normal line voltage is −48 volts D.C. Even when a ringing signal is applied, the voltage level does not reach +100 volts. The zener diode CR9 will therefore block all voltages below +100 volts D.C. and pass the disconnect signal (+130 volts D.C.) on to transistor Q1.

A first coil 16 of the latching relay is then activated upon receipt of the signal voltage by operation of the transistor Q1 which acts as a switch and initiates the switching action upon receipt of the remaining +30 volts passing through the zener diode CR9. When the switch transistor Q1 is activated to the ON condition, this in turn operates the latching relay to move the contacts 18, 20 thereof from a first position to a second position. In the aforementioned first position ("thru state"), as has been stated hereinabove, the contacts close the line 10 and 12 on through to the subscriber equipment. In the second condition, ("open state") the contacts open lines 10,12, and the contacts 18,20 close the branches 19,21 respectively. Thus, the current is carried from the central station through to grounds 22,24, passing through resistors R3, R4 respectively. When the equipment at the central station sees this signal passed on through to grounds 22,24 and receives a predictable signal indicative thereof, it is then known that the lines are continuous to the customer, and the line can be tested, free of customer equipment.

The second switching network 26 is arranged similarly to switching network 14 and includes therein a second coil 28 of the latching relay, a second transistor Q2, and a second zener diode CR10. When the +130 volt signal is removed from the lines, the zener diode CR10, which has a threshold voltage of +24 volts, is able to sense the drop of voltage to a level below +24 volts. The current coming through lines 19 and 21 is thus passed on through to transistor Q2, which in turn activates the second coil 28 of the latching relay. The second coil 28 returns contacts 18 and 20 to their normal condition in which the electrical path through lines 19 and 21 is cut, restoring the subscriber equipment to the "thru state." Thus the cycle is completed.

While a preferred embodiment is described in detail hereinabove, it is apparent that various changes and modifications to the detailed description might be made without departing from the scope of the invention, which is set forth in the accompanying claims.

What is claimed is:

1. An improved telephone subscriber equipment disconnect apparatus for use in remotely disconnecting and connecting said subscriber equipment and a central telephone station which in a normal condition are connected by tip and ring lines carrying a normal potential of −48 volts D.C., said apparatus comprising:
   (a) means at said central station for generating a disconnect signal on at least one of said tip and ring lines, said signal comprising a D.C. voltage of a selected value substantially different from said normal −48 volt potential;
   (b) a first switching means directly resonsive to said disconnect signal for substantially immediately disconnecting both said tip and said ring lines from said subscriber equipment, resulting in the complete isolation of said subscriber equipment, and for connecting each of said tip and ring lines to ground through separate prescribed resistances selected to be indicative of satisfactory line switching; and
   (c) second switching means directly responsive to removal of said disconnect signal and resumption of said normal voltage on said lines for again and immediately re-establishing connection of said subscriber equipment.

2. The apparatus according to claim 1 wherein said first switching means comprises:
   (a) a first recognition means for sensing the application of said disconnect signal;
   (b) a first coil of a latching relay electromagnetically associated with a pair of contacts which in a first condition establish a "thru state" of voltage from said central station to said subscriber equipment and in a second condition establish an "open state" in which the signal from said central station is connected to said ground through said prescribed resistances; and
   (c) a first semiconductor switch device operative responsive to said first recognition means to shift said first coil from a state in which said contacts are in said first condition to a state in which said contacts are in said second condition.

3. The apparatus according to claim 2 wherein said second switching means comprises:
   (a) a second recognition means for sensing the removal of said disconnect signal;
   (b) a second coil of said latching relay electromagnetically associated with said pair of contacts; and a second semiconductor switch device operative responsive to said second recognition means to shift said second coil from a state in which said contacts are in said second condition to a state in which said contacts are in said first condition.

4. The apparatus according to claim 3 wherein said first and second recognition means are zener diodes.

5. The apparatus according to claim 3 wherein said first and second semiconductor switch devices are transistors.

6. Apparatus for remotely and selectively disconnecting subscriber equipment from incoming ring and tip telephone lines comprising:
   (a) a first switching network including a latching relay having a first coil operative directly responsive to a first signal voltage on one of said tip and ring lines greater than the normal line voltage and of opposite polarity thereto to disconnect said subscriber equipment from both of said tip and ring lines lines;
   (b) a second switching network including a second coil of said latching relay operative directly responsive to a return of said line voltage to normal to reconnect said subscriber equipment;
   (c) a branch line from each of said ring and tip lines connected to ground by a relatively large resistance; and
   (d) switch contacts operated by said switching networks between a first condition allowing current to said subscriber equipment during normal operation, said contacts being shifted by said first switching network to a second position cutting off flow of current to said subscriber equipment and causing current flow through said branch lines to ground, said contacts being shifted by said second switch network back to said first position in which said subscriber equipment is reconnected.

* * * * *